P. W. NELSON.
Barrel-Swing.
No. 226,538.
Patented April 13, 1880.
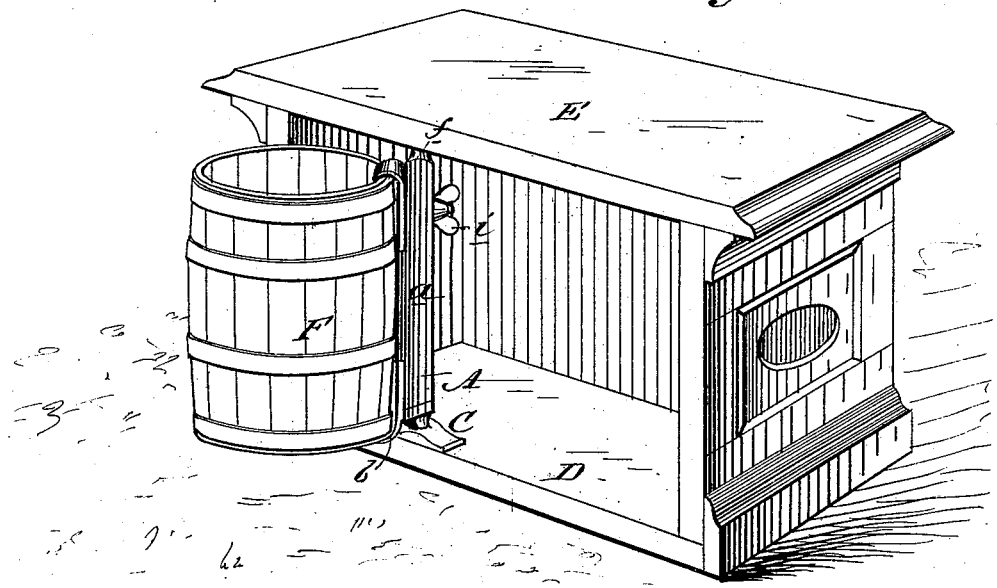
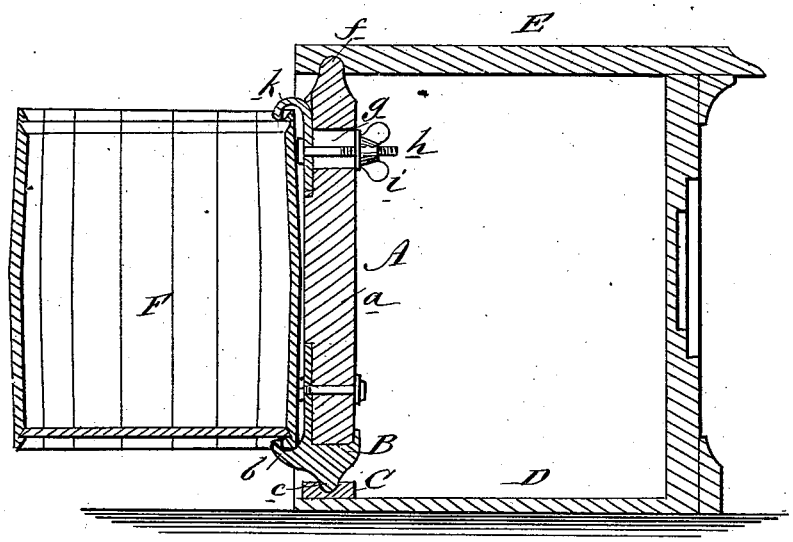
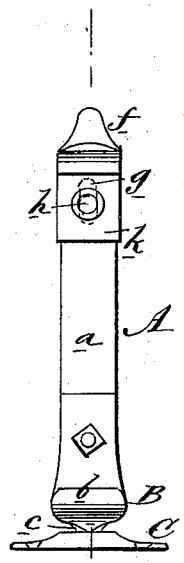
WITNESSES:
C. Neveux
C. Sedgwick
INVENTOR:
P. W. Nelson
BY Munn & Co
ATTORNEYS.

UNITED STATES PATENT OFFICE.

PETER W. NELSON, OF MOLINE, ILLINOIS.

BARREL-SWING.

SPECIFICATION forming part of Letters Patent No. 226,538, dated April 13, 1880.

Application filed January 27, 1880.

*To all whom it may concern:*

Be it known that I, PETER W. NELSON, of Moline, Rock Island county, State of Illinois, have invented a new and Improved Barrel-Swing, of which the following is a specification.

Figure 1 is a perspective view of the device attached to a counter and holding a barrel in position. Fig. 2 is a sectional side elevation of the same, and Fig. 3 is a front elevation of the device.

Similar letters of reference indicate corresponding parts.

The object of this invention is to provide a device of especial convenience to shop-keepers, whereby barrels of groceries or other articles may be supported and readily swung in and out under the shop-counter.

The invention consists of a vertical bar having at each end a laterally-extending hook or clasp, the upper hook or clasp being vertically adjustable, said bar being pivoted above in the under side of the counter, near its edge, and below in the floor, so that it can be turned outward to receive a barrel between its hooks or clasps and be swung around to carry the barrel under the counter.

In the drawings, A represents the barrel-swing, which consists, as shown, of a wooden bar, $a$, whose lower end is secured in the socketed end plate, B, which end plate, B, is provided with a laterally-projecting hook or clasp, $b$, and a pivot-point, $c$, that serves as the lower pivot to pivot the said barrel-swing A in the base-plate C, which is secured to the floor D.

The upper end of the swing A is fashioned to a point, $f$, that serves as the upper pivot and enters the under side of the counter E, as shown. Near the upper end of this barrel-swing A, and passing laterally through it, is a vertical slot, $g$, through which passes a thumb-screw, $h$, that, in combination with the nut $i$, serves to hold the upper hook or clasp, $k$, so that said hook or clasp can be vertically adjusted to accommodate itself to the height of barrel to be held by the said swing A.

F represents a barrel held by the barrel-swing A so that it may be swung in and out under the counter E.

Having thus described my invention, I claim as new and desire to secure by Letters Patent—

The combination of the bar $a$, having point $f$ and slot $g$, the socketed end plate, B, having hook $b$ and pivot $c$, the base-plate C, the hook $k$, screw $h$, and nut $i$, as and for the purpose specified.

PETER WINDQUEST NELSON.

Witnesses:
GUSTAF SWENSSON,
H. P. OAKLEY.